United States Patent
Xu et al.

(10) Patent No.: US 10,631,317 B2
(45) Date of Patent: Apr. 21, 2020

(54) METHOD AND APPARATUS FOR PROCESSING BUFFER STATUS REPORT AND COMMUNICATION SYSTEM

(71) Applicant: FUJITSU LIMITED, Kawasaki-shi, Kanagawa (JP)

(72) Inventors: Haibo Xu, Beijing (CN); Lianhai Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 179 days.

(21) Appl. No.: 15/657,720

(22) Filed: Jul. 24, 2017

(65) Prior Publication Data

US 2017/0325255 A1  Nov. 9, 2017

Related U.S. Application Data

(63) Continuation of application No. PCT/CN2015/071548, filed on Jan. 26, 2015.

(51) Int. Cl.
  *H04W 72/12* (2009.01)
  *H04L 12/26* (2006.01)
  *H04W 72/14* (2009.01)

(52) U.S. Cl.
  CPC ......... *H04W 72/1252* (2013.01); *H04L 43/00* (2013.01); *H04W 72/1263* (2013.01); *H04W 72/14* (2013.01)

(58) Field of Classification Search
  CPC .............. H04W 72/14; H04W 72/1252; H04W 72/1263; H04W 28/0278; H04W 28/06;
(Continued)

(56) References Cited

U.S. PATENT DOCUMENTS 9,479,957 B2  10/2016 Lee et al.
2014/0010179 A1*  1/2014 Lee .................. H04W 72/0406
 370/329
(Continued)

FOREIGN PATENT DOCUMENTS

CN  102291760 A  12/2011
GB   2512398 A  10/2014
(Continued)

OTHER PUBLICATIONS

Lee, Y. U.S. Appl. No. 62/097,589, filed Dec. 30, 2014. (Year: 2014).*
(Continued)

*Primary Examiner* — Kyaw Z Soe
(74) *Attorney, Agent, or Firm* — Myers Wolin, LLC

(57) ABSTRACT

This application provides a method and apparatus for processing a buffer status report and a communication system, the method being applicable to user equipment (UE) and including: whether in an TTI where an allocated uplink resource for the TTI is capable of accommodating a ProSe BSR MAC CE containing a buffer status for at least one ProSe Destination and its corresponding MAC subheader is judged; if yes, whether there exist side-link data available for transmission in the TTI is judged; and if no, all triggered ProSe BSRs are cancelled. With embodiments of this disclosure, a problem that UE is unable to determine contents of a ProSe BSR MAC CE to be transmitted at a TTI when triggered ProSe BSRs can be transmitted is solved.

16 Claims, 11 Drawing Sheets

(58) Field of Classification Search
CPC ......... H04W 72/1284; H04W 72/1221; H04W 76/14; H04L 12/26; H04L 43/00; H04L 43/0829
See application file for complete search history.

(56) References Cited

U.S. PATENT DOCUMENTS

| | | | |
|---|---|---|---|
| 2016/0080969 A1* | 3/2016 | Tseng | H04W 4/70 370/329 |
| 2016/0135217 A1* | 5/2016 | Lee | H04L 47/30 370/329 |
| 2016/0219620 A1* | 7/2016 | Lee | H04W 72/14 |
| 2016/0285775 A1* | 9/2016 | Damnjanovic | H04L 47/30 |
| 2017/0289908 A1* | 10/2017 | Lee | H04W 52/0219 |
| 2017/0290028 A1* | 10/2017 | Lee | H04W 72/1278 |
| 2018/0054807 A1* | 2/2018 | Lee | H04W 12/08 |

FOREIGN PATENT DOCUMENTS

| | | |
|---|---|---|
| WO | 2013/191353 A1 | 12/2013 |
| WO | 2014/145845 A1 | 9/2014 |
| WO | 2014/161168 A1 | 10/2014 |
| WO | 2014/163287 A1 | 10/2014 |
| WO | 2014/209077 A1 | 12/2014 |

OTHER PUBLICATIONS

Notification of Reasons for Refusal issued by the Japan Patent Office for corresponding Japanese Patent Application No. 2017-538589, dated Jul. 3, 2018, with an English translation.
Asustek, "Discussion on ProSe BSR and SR cancellation", Agenda Item: 7.3.3.3, 3GPP TSG-RAN WG2 Meeting #88, R2-145066, San Francisco, US, Nov. 17-21, 2014.
LG Electronics Inc., "BSR cancellation for ProSe communication", Agenda Item: 7.3.3.3, 3GPP TSG-RAN WG2 Meeting #88, R2-145039, San Francisco, USA, Nov. 17-21, 2014.
Notice of Preliminary Rejection issued by the Korean Intellectual Property Office for corresponding Korean Patent Application No. 10-2017-7021886, dated Aug. 13, 2018, with English translation.
Panasonic, "Cancellation of BSR for multiple UL grant case", Agenda Item: 7.1.4.1, 3GPP TSG-RAN WG2 Meeting #73, R2-110892, Taipei, Taiwan, Feb. 21-25, 2011.
International Search Report issued for corresponding International Patent Application No. PCT/CN2015/071548, dated Oct. 29, 2015, with an English translation.
Huawei et al., "ProSe-BSR Triggering and Cancelling Mechanisms and Text Proposals", Agenda Item: 7.3.2.2.2, 3GPP TSG-RAN WG2 Meeting #87bis, R2-144407, Shanghai, China, Oct. 6-10, 2014.
Ericsson, Change request for "Introduction of ProSe", 3GPP TSG-RAN WG2 Meeting #88, R2-145307, San Francisco, USA, Nov. 17-21, 2014.
The partial European search report issued by the European Patent Office for corresponding European Patent Application No. 15879314.1, dated Oct. 25, 2018.
Extended European search report with supplementary European search report and the European search opinion issued by the European Patent Office for corresponding European Patent Application No. 15879314.1, dated Jan. 29, 2019.

* cited by examiner

METHOD AND APPARATUS FOR PROCESSING BUFFER STATUS REPORT AND COMMUNICATION SYSTEM

CROSS REFERENCE TO RELATED APPLICATIONS

This application is a continuation application of International Application PCT/CN2015/071548 filed on Jan. 26, 2015, the entire contents of which are incorporated herein by reference.

FIELD

This disclosure relates to the field of communication technologies, and in particular to a method and apparatus for processing a buffer status report and a communication system.

BACKGROUND

Currently, in a long-term evolution (LTE) system, communication between terminal devices needs to be performed via a radio access network and a core network. As appearance of demands for many new traffics, and at the same time, in order to reduce a load of a network and achieve transfer of the load of the network, the communication between terminal devices has gradually become a new direction for studies. When a distance between two terminal devices is sufficiently near, the terminal device may discover existence of the counterpart, hence, direct communication between devices may be performed under control of an eNB.

In order to realize device to device communication, two types of air-interface resource allocation schemes, mode 1 and mode 2, are defined in an LTE-A (LTE-advanced) system. In mode 1, in order to avoid influencing reporting of a buffer status report (BSR) directed to a traffic of a conventional infrastructural communication mode, a mechanism of BSR directed to the device to device communication (which may be referred to as a ProSe BSR) is introduced, which mainly includes a triggering mechanism of a new BSR and an MAC signaling format and content of the BSR.

Currently, two ProSe BSR formats are defined for device to device (D2D) communication, which are shown in FIGS. 1 and 2, respectively. The two formats are both formats used for reporting ProSe BSRs in a case where there exist available to-be-transmitted data in ProSe destinations (sidelink destinations or sidelink targets). In other words, within a TTI transmitting ProSe BSRs, when all ProSe destinations have no data to be transmitted, UE is unable to determine which formats should be used by the reported ProSe BSRs.

A concept of a sidelink control period (briefly referred to as an SC period) is defined in the device to device (D2D) communication mode, the SC period referring to a time period containing scheduling control and transmission of data to which it corresponds. For mode 1, a basic operational principle of data transmission at a transmitter end in the D2D communication is as follows.

After scheduling of data transmission of a D2D user equipment (UE) is determined, an eNB transmits an SL grant (a sidelink grant) to the UE via a physical downlink control channel (PDCCH) scrambled by a sidelink radio network temporary identity (SL-RNTI), the SL grant containing time-frequency resource positions of scheduling control (SC) to be transmitted by the UE and time-frequency resource positions of data to be transmitted. A period of validity of the SL grant is one SC period, and an SC period to which it corresponds is a next SC period starting from 4 ms after a subframe transmitting the SL grant. After receiving an SL grant, the UE will first transmit the SC twice at a resource position of the SC indicated by the SL grant within the SC period to which the SL grant corresponds, and then transmit transport blocks (TBs) at resource positions of data indicated by the SL grant; wherein, each TB will be transmitted for four times, and the number of TBs that can be transmitted within one SC period is dependent on the number of resources allocated in the SL grant. FIG. 3 is a schematic diagram of the transmission process.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In some cases, at a TTI moment when UE has sufficient uplink grants for transmitting triggered ProSe BSRs, all ProSe destinations of the UE have no available to-be-transmitted data. In such cases, at a TTI moment when the triggered ProSe BSRs may be transmitted, the UE is unable to determine contents of a ProSe BSR MAC CE to be transmitted, hence, it is unable to report a current buffer status.

In order to solve the above problem, embodiments of this disclosure provide a method and apparatus for processing a buffer status report and a communication system.

According to a first aspect of the embodiments of this disclosure, there is provided a method for processing a buffer status report, applicable to user equipment (UE), the method including: whether in an TTI where an allocated uplink resource for the TTI is capable of accommodating a ProSe BSR MAC CE containing a buffer status for at least one ProSe Destination and its corresponding MAC subheader is judged; if yes, whether there exist side-link data available for transmission in the TTI is judged; and if no, all triggered ProSe BSRs are cancelled.

According to a second aspect of the embodiments of this disclosure, there is provided a method for processing a buffer status report, applicable to user equipment (UE), the method including: whether in an TTI where an allocated uplink resource for the TTI is capable of accommodating a ProSe BSR MAC CE containing a buffer status for at least one ProSe Destination and its corresponding MAC subheader is judged; if yes, whether there exist side-link data available for transmission in the TTI is judged; and if no, a ProSe BSR MAC CE with N being 1 and its corresponding MAC subheader is reported, or a ProSe BSR MAC CE having only one buffer size domain and its corresponding MAC subheader is reported, or only one MAC subheader is reported.

According to a third aspect of the embodiments of this disclosure, there is provided an apparatus for processing a buffer status report, applicable to user equipment (UE), the apparatus including: a first judging unit configured to judge whether in an TTI where an allocated uplink resource for the TTI is capable of accommodating a ProSe BSR MAC CE containing a buffer status for at least one ProSe Destination and its corresponding MAC subheader; a second judging unit configured to, when it is judged yes by the first judging unit, judge whether there exist side-link data available for transmission in the TTI; and a cancelling unit configured to, when it is judged no by the second judging unit, cancel all triggered ProSe BSRs.

According to a fourth aspect of the embodiments of this disclosure, there is provided an apparatus for processing a buffer status report, applicable to user equipment (UE), the apparatus including: a first judging unit configured to judge whether in an TTI where an allocated uplink resource for the TTI is capable of accommodating a ProSe BSR MAC CE containing a buffer status for at least one ProSe Destination and its corresponding MAC subheader; a second judging unit configured to, when it is judged yes by the first judging unit, judge whether there exist side-link data available for transmission in the TTI; and a reporting unit configured to, when it is judged no by the second judging unit, report a ProSe BSR MAC CE with N being 1 and its corresponding MAC subheader, or report a ProSe BSR MAC CE having only one buffer size domain and its corresponding MAC subheader, or report only one MAC subheader.

According to a fifth aspect of the embodiments of this disclosure, there is provided user equipment, including the apparatus for processing a buffer status report as described in the third or the fourth aspect.

According to a sixth aspect of the embodiments of this disclosure, there is provided a communication system, including user equipment; wherein, the user equipment is configured to: in an TTI where an allocated uplink resource for the TTI is capable of accommodating a ProSe BSR MAC CE containing a buffer status for at least one ProSe Destination and its corresponding MAC subheader, if there exist no side-link data available for transmission in the TTI, cancel all triggered ProSe BSRs, or report a ProSe BSR MAC CE with N being 1 and its corresponding MAC subheader, or report a ProSe BSR MAC CE having only one buffer size domain and its corresponding MAC subheader, or report only one MAC subheader.

According to another aspect of the embodiments of this disclosure, there is provided a computer readable program code, which, when executed in an apparatus for processing a buffer status report or UE, will cause a computer unit to carry out the method for processing a buffer status report as described in the first or the second aspect in the apparatus for processing a buffer status report or the UE.

According to a further aspect of the embodiments of this disclosure, there is provided a computer readable medium, including a computer readable program code, which will cause a computer unit to carry out the method for processing a buffer status report as described in the first or the second aspect in an apparatus for processing a buffer status report or UE.

An advantage of the embodiments of this disclosure exists in that with the embodiments of this disclosure, a problem that UE is unable to determine contents of a ProSe BSR MAC CE to be transmitted at a TTI moment when triggered ProSe BSRs can be transmitted is solved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. The embodiments of this disclosure shall be described below with reference to the accompanying drawings. The embodiments are illustrative only, and are not intended to limit this disclosure.

FIGS. 4-8 are schematic diagrams of five application scenarios in an embodiment of this disclosure. In such scenarios, a case will occur where "at a TTI moment when UE has sufficient uplink grants (UL grants) for transmitting triggered ProSe BSRs, all ProSe Destinations of the UE have no available to-be-transmitted data".

Figure 1:
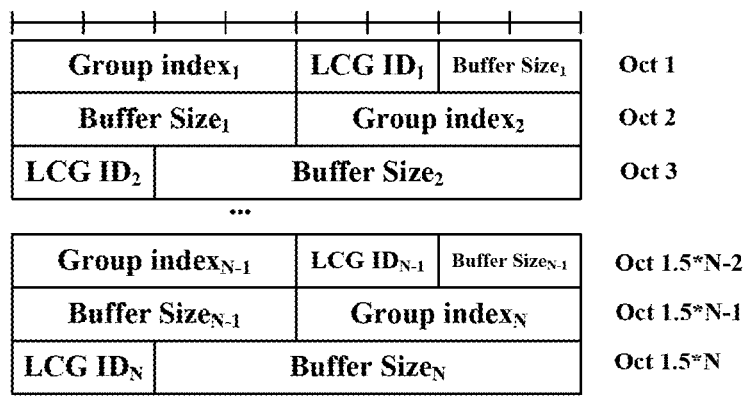
FIG. 1 is a schematic diagram of a format of a ProSe BSR MAC CE when N is an even number.
Figure 2:
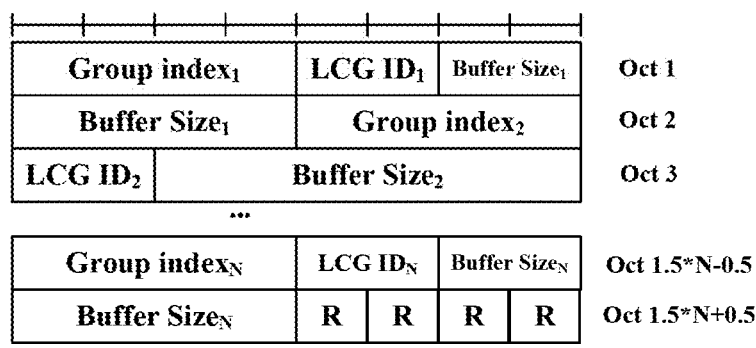
FIG. 2 is a schematic diagram of a format of a ProSe BSR MAC CE when N is an odd number.
Figure 3:
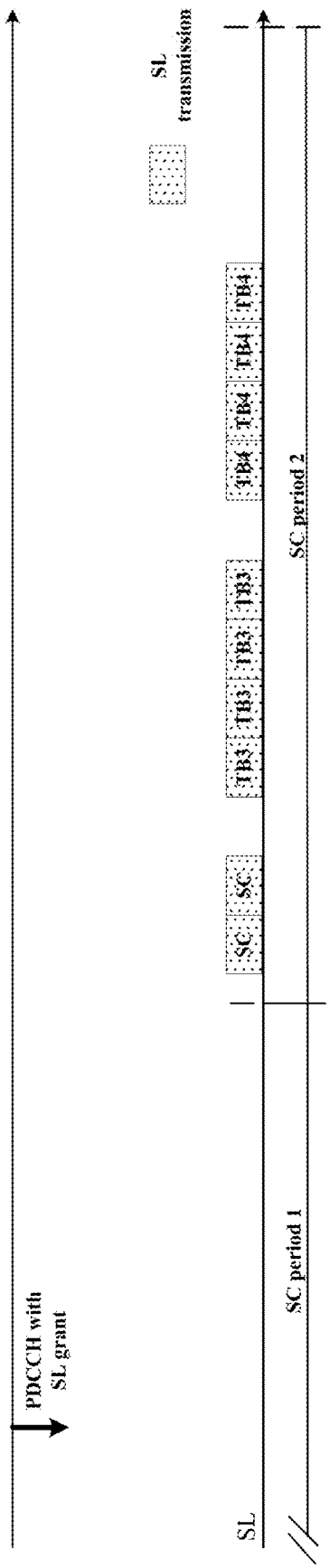
FIG. 3 is a schematic diagram of a basic operational principle of data transmission at a transmitter end in D2D communication.
Figure 4:
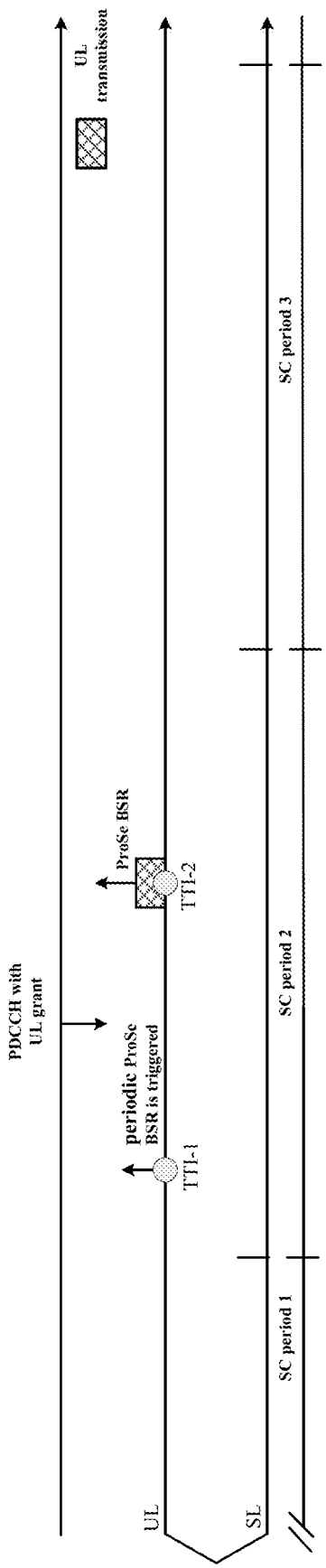
FIGS. 4-8 are schematic diagrams of five application scenarios of an embodiment.

As shown in FIG. 4, in this scenario, at a certain TTI (such as TTI-1 shown in FIG. 4), a Periodic-ProSeBSR-Timer expires, and at this moment, a periodic ProSe BSR is triggered.

However, at this TTI, there exists no data available for transmission in a sidelink buffer of the UE. At a TTI when the UE has sufficient uplink grants for transmitting triggered ProSe BSRs (such as TTI-2 shown in FIG. 4), there still exists no data available for transmission in the sidelink buffer of the UE.

Figure 5:
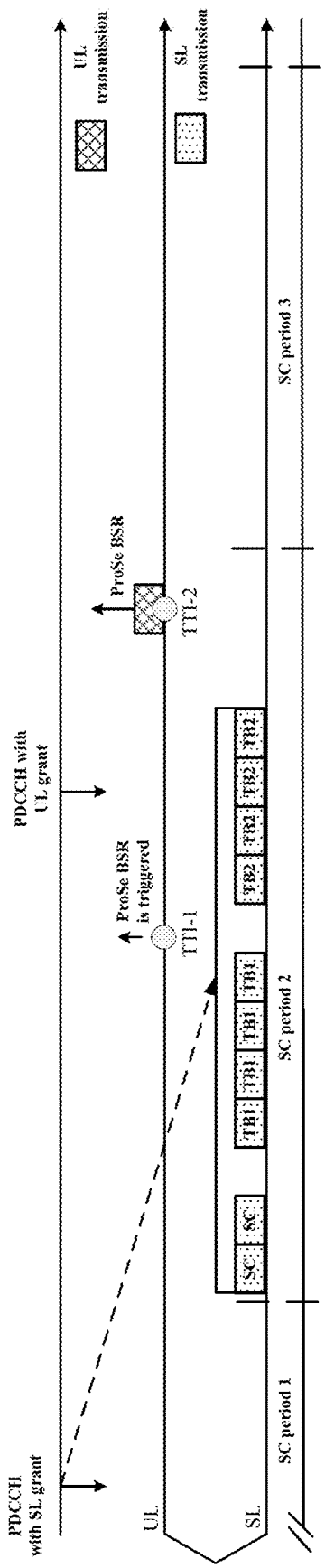

As shown in FIG. 5, in this scenario, at a certain TTI (such as TTI-1 shown in FIG. 5), a ProSe BSR is triggered. At this TTI, the UE at least has one ProSe destination having data available for transmission. Before the ProSe BSR is triggered, the UE has obtained a PDCCH with SL grants by decoding. At or before a TTI when the UE has sufficient uplink grants for transmitting triggered ProSe BSRs (such as TTI-2 shown in FIG. 5), all data available for transmission have been transmitted by using the above-described SL grants.

Figure 6:
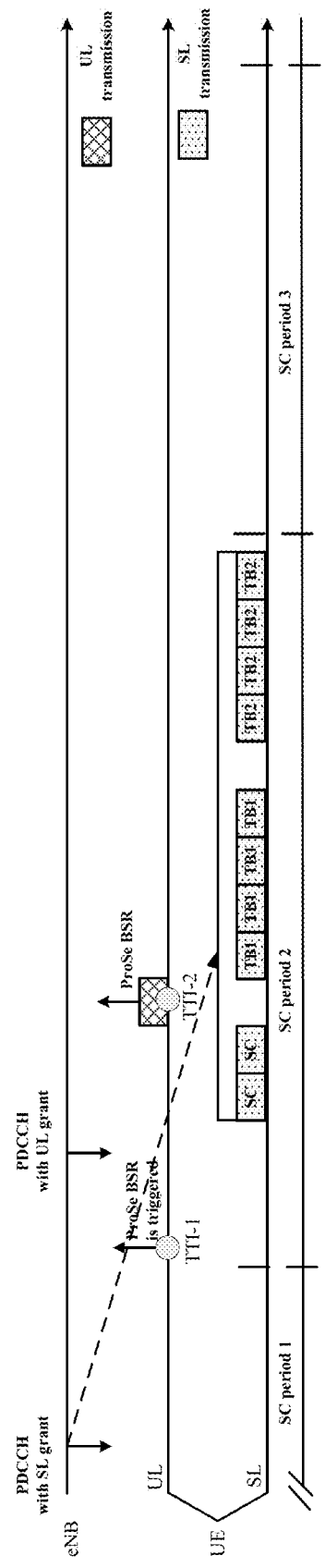

As shown in FIG. 6, in this scenario, at a certain TTI (such as TTI-1 shown in FIG. 6), a ProSe BSR is triggered. At this TTI, the UE at least has one ProSe destination having data available for transmission. Before the ProSe BSR is triggered, the UE has obtained a PDCCH with SL grants by decoding, and the SL grants are used for an SC period containing a TTI at which ProSe BSRs can be transmitted (such as TTI-2 shown in FIG. 6). At a TTI when the UE has sufficient uplink grants for transmitting triggered ProSe BSRs (such as TTI-2 shown in FIG. 6), remaining SL grants in the above-described SL grants may accommodate all data available for transmission.

Figures 7, 8:
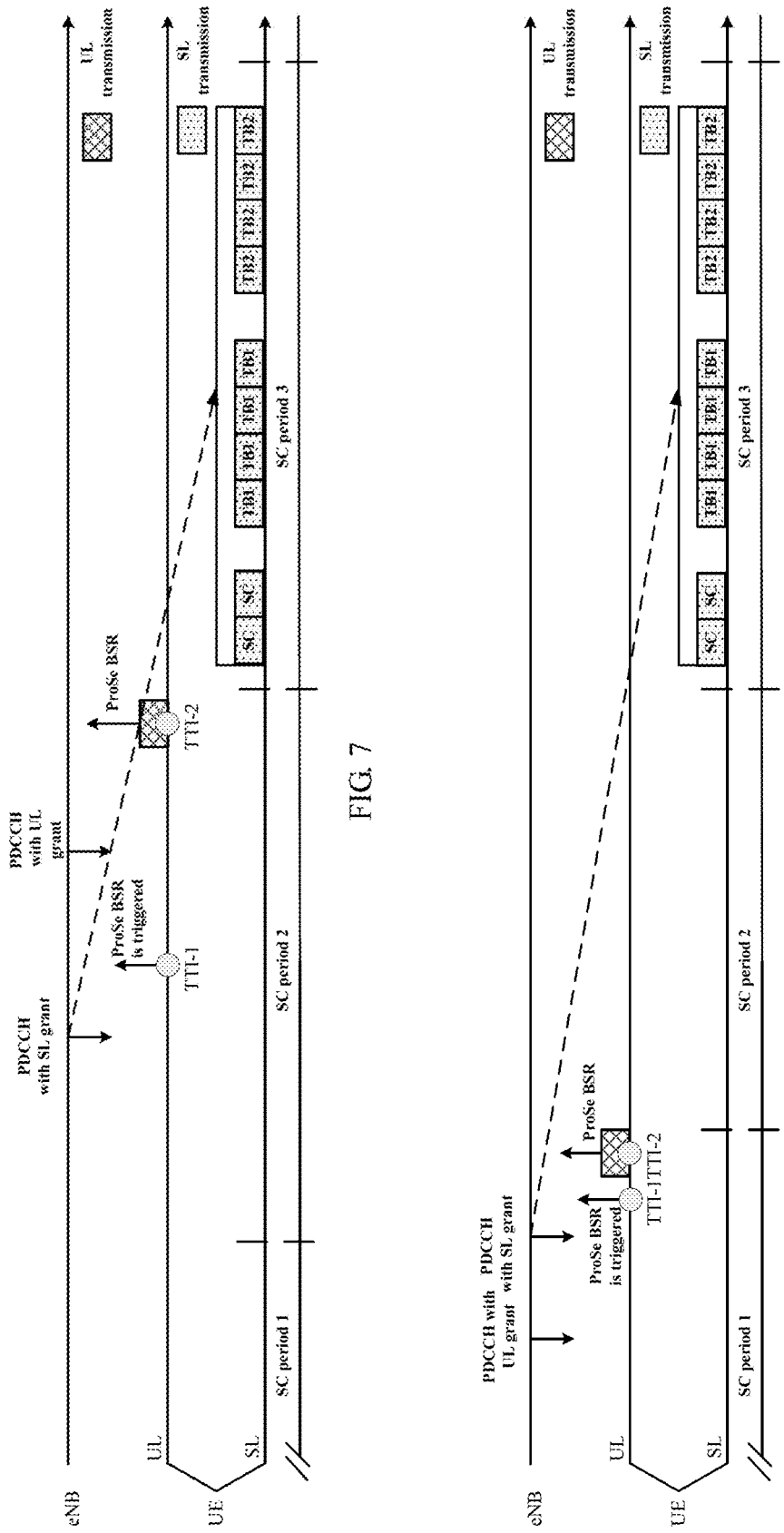

As shown in FIG. 7, in this scenario, at a certain TTI (such as TTI-1 shown in FIG. 7), a ProSe BSR is triggered. At this TTI, the UE at least has one ProSe destination having data available for transmission. Before the ProSe BSR is triggered, the UE has obtained a PDCCH with SL grants by decoding, and the SL grants are used for an SC period next to an SC period containing a TTI at which ProSe BSRs can be transmitted. At a TTI when the UE has sufficient uplink grants for transmitting triggered ProSe BSRs (such as TTI-2 shown in FIG. 7), remaining SL grants in the above-described SL grants may accommodate all data available for transmission.

As shown in FIG. 8, in this scenario, at a certain TTI (such as TTI-1 shown in FIG. 8), a ProSe BSR is triggered. At this TTI, the UE at least has one ProSe destination having data available for transmission. Before the ProSe BSR is triggered, the UE has obtained a PDCCH with SL grants by decoding, and the SL grants are used for an SC period secondarily next to an SC period containing a TTI at which ProSe BSRs can be transmitted. At a TTI when the UE has sufficient uplink grants for transmitting triggered ProSe BSRs (such as TTI-2 shown in FIG. 8), remaining SL grants in the above-described SL grants may accommodate all data available for transmission.

The above scenarios are examples only, the embodiments of this disclosure are applicable to, in addition to the above scenarios, other implementable scenarios. The embodiments of this disclosure shall be described below with reference to the accompanying drawings.

Embodiment 1

Figure 9:
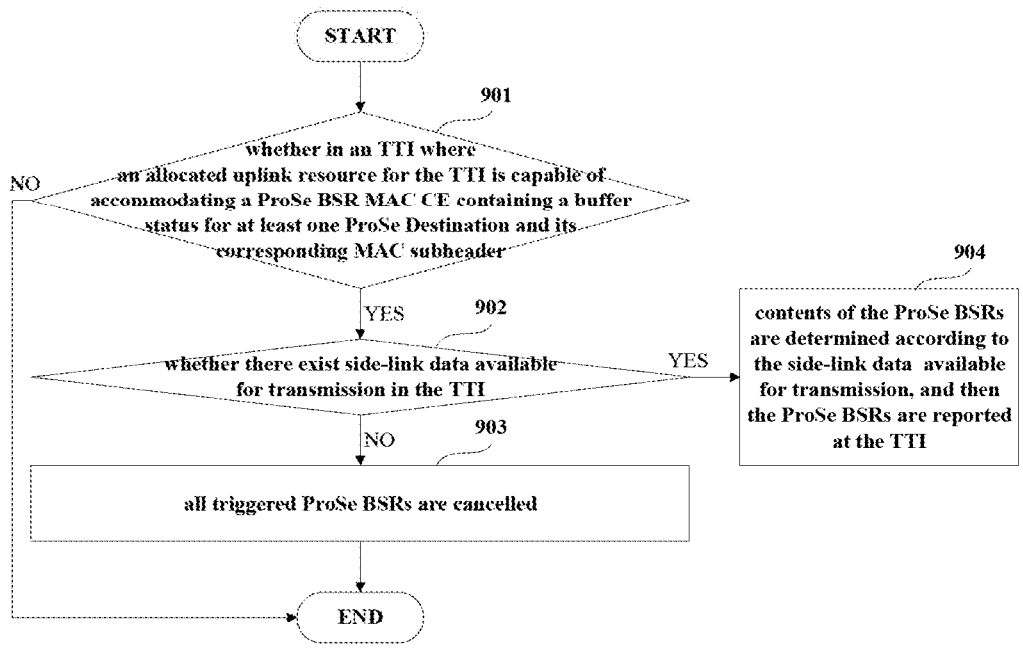
FIG. 9 is a flowchart of an implementation of a method for processing a buffer status report of Embodiment 1.

An embodiment of this disclosure provides a method for processing a buffer status report, applicable to user equipment (UE). FIG. 9 is a flowchart of the method. As shown in FIG. 9, the method includes:

step 901: whether in an TTI where an allocated uplink resource for the TTI is capable of accommodating a ProSe BSR MAC CE containing a buffer status for at least one ProSe Destination and its corresponding MAC subheader is judged; if yes, step 902 is executed; otherwise, the process is terminated;

step 902: whether there exist side-link data available for transmission in the TTI is judged; and if no, step 903 is executed; otherwise, step 904 is executed;

wherein, the judgment here may be performed according to data actually existed in the sidelink buffer; if there actually exist data in the buffer, it is judged yes, and step 904 is executed; and if there actually exists no data in the buffer, it is judged no, and step 903 is executed;

step 903: all triggered ProSe BSRs are cancelled; and step 904: contents of the ProSe BSRs, i.e. contents of the ProSe BSR MAC CE, are determined according to the side-link data available for transmission, and then the ProSe BSRs are reported at the TTI.

In this embodiment, within a TTI, when the allocated uplink resource for the TTI is capable of accommodating the ProSe BSR MAC CE containing a buffer status for at least one ProSe Destination and its corresponding MAC subheader (it is judged yes in step 901), if there exists no side-link data available for transmission in the TTI (it is judged no in step 902), all the triggered ProSe BSRs are cancelled (step 903); hence, a problem that contents of a ProSe BSR MAC CE to be transmitted are unable to be determined in scenarios 1 and 2 is solved.

In this embodiment, within a TTI, when the allocated uplink resource for the TTI is capable of accommodating the ProSe BSR MAC CE containing a buffer status for at least one ProSe Destination and its corresponding MAC subheader (it is judged yes in step 901), if there exist side-link data available for transmission in the TTI (it is judged yes in step 902), contents of the ProSe BSRs, that is, contents of the ProSe BSR MAC CE, may be determined according to the side-link data available for transmission by using an existing method or other implementable methods, and then the ProSe BSRs are reported at the TTI for reporting ProSe BSRs (step 904).

In this embodiment, within a TTI, when the allocated uplink resource for the TTI is incapable of accommodating the ProSe BSR MAC CE containing a buffer status for at least one ProSe Destination and its corresponding MAC subheader (it is judged no in step 901), no ProSe BSR needs to be reported, hence, contents of the ProSe BSR MAC CE need not to be determined, that is, the problem in scenarios 1 and 2 does not exist, and no processing is needed.

In an implementation of this embodiment, before step 902, for example, before or after step 901, the method of this embodiment may further include a step as follows:

step 900 (not shown): after obtaining a PDCCH with an SL grant by decoding or at a beginning of an SC period for the SL grant, a size of data that can be transmitted in the whole SC period to which the SL grant corresponds is determined according to resources allocated in the SL grant for transmitting data, and all SL MAC PDUs that can be transmitted in the SC period to which the SL grant corresponds are generated according to the size of data that can be transmitted.

In this embodiment, as the SL grant obtained by decoding is taken into account, all SL MAC PDUs that can be transmitted in the SC period to which the SL grant obtained by decoding corresponds are built first, and then whether there exist side-link data available for transmission at the TTI for reporting ProSe BSRs is judged. Hence, even though there exist data to be transmitted, the data shall not be taken into account, as their SL MAC PDUs have been built, and it is judged there exist no side-link data available for transmission. Therefore, not only the problem that contents of a ProSe BSR MAC CE to be transmitted are unable to be determined in scenarios 1 and 2 is solved, but also a problem that contents of a ProSe BSR MAC CE to be transmitted are unable to be determined in scenarios 3, 4 and 5 is solved.

In an implementation of this embodiment, after step 902, if there exist side-link data available for transmission at the TTI for reporting ProSe BSRs, the method may further include steps as follows:

S1: whether there exists a remaining configured SL grant is judged, S2 is executed when it is judged yes, and step 904 is executed when it is judged no; and S2: whether all the side-link data available for transmission can be accommodated by the remaining configured SL grant is judged, step 903 is executed when it is judged yes, and step 904 is executed when it is judged no.

In this implementation, the configured SL grant may be a configured SL grant for an SC period next to the SC period containing the TTI. If the configured SL grant for the SC period next to the SC period containing the TTI is capable of accommodating all the side-link data available for transmission, such as in the case described in scenario 4, although there exist side-link data available for transmission in the SC period next to the SC period containing the TTI, the side-link data available for transmission have an SL grant already, and the SL grant is capable of accommodating all the side-link data available for transmission. Hence, there exists actually no side-link data available for transmission, and all the triggered ProSe BSRs are cancelled.

In this implementation, the configured SL grant may also be a configured SL grant for an SC period secondarily next to the SC period containing the TTI. If the configured SL grant for the SC period secondarily next to the SC period containing the TTI is capable of accommodating all the side-link data available for transmission, such as in the case described in scenario 5, although there exist side-link data available for transmission in the SC period secondarily next to the SC period containing the TTI, the side-link data available for transmission have an SL grant already, and the SL grant is capable of accommodating all the side-link data available for transmission. Hence, there exists actually no side-link data available for transmission, and all the triggered ProSe BSRs are cancelled.

In this implementation, if it is judged no in S1 or S2, contents of ProSe BSRs, that is, contents of the ProSe BSR MAC CE, may be determined according to side-link data available for transmission with those that may be accommodated by the SL grant being excluded, and then the ProSe BSRs are reported at the TTI.

With the method of this embodiment, a problem that UE is unable to determine contents of a ProSe BSR MAC CE to be transmitted at a TTI when triggered ProSe BSRs can be transmitted is solved.

Embodiment 2

Figure 10:
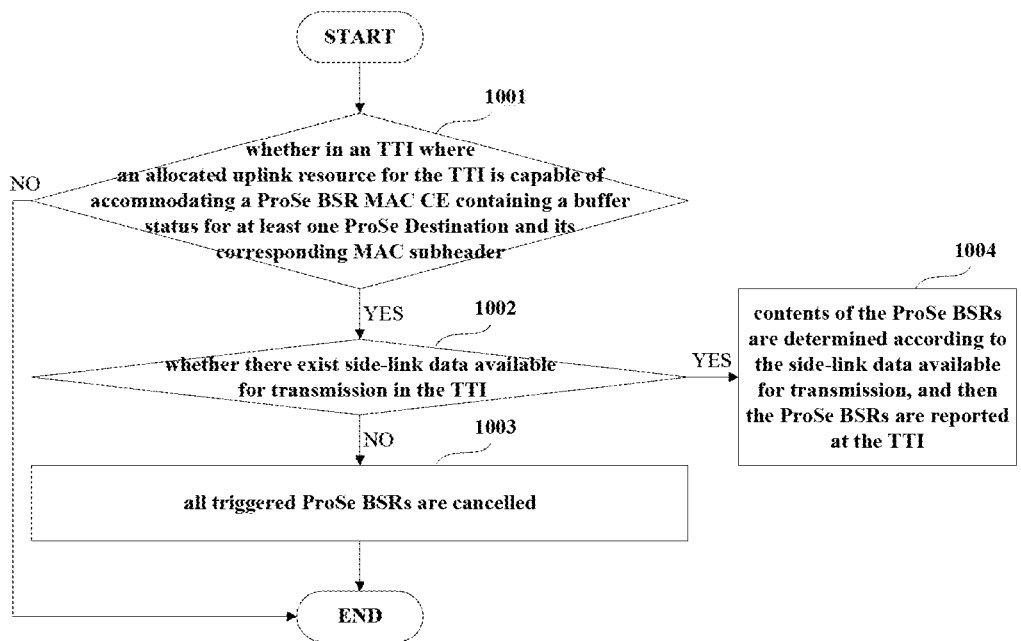
FIG. 10 is a flowchart of an implementation of a method for processing a buffer status report of Embodiment 2.

An embodiment of this disclosure provides a method for processing a buffer status report, applicable to user equipment (UE). FIG. 10 is a flowchart of the method. As shown in FIG. 10, the method includes:

step 1001: whether in an TTI where an allocated uplink resource for the TTI is capable of accommodating a ProSe BSR MAC CE containing a buffer status for at least one ProSe Destination and its corresponding MAC subheader is judged; if yes, step 1002 is executed; otherwise, the process is terminated;

step 1002: whether there exist side-link data available for transmission in the TTI is judged; and if no, step 1003 is executed; otherwise, step 1004 is executed;

wherein, the judgment may be performed according to data actually existed in the sidelink buffer, and may also be performed according to data actually existed in the sidelink buffer and an SL grant obtained by decoding, which shall be described below;

step 1003: all triggered ProSe BSRs are cancelled; and step 1004: contents of the ProSe BSRs, i.e. contents of the ProSe BSR MAC CE, are determined according to the side-link data available for transmission, and then the ProSe BSRs are reported at the TTI.

In this embodiment, within a TTI, when the allocated uplink resource for the TTI is capable of accommodating the ProSe BSR MAC CE containing a buffer status for at least one ProSe Destination and its corresponding MAC subheader (it is judged yes in step 1001), if there exists no side-link data available for transmission in the TTI (it is judged no in step 1002), all the triggered ProSe BSRs are cancelled (step 1003).

In this embodiment, within a TTI, when the allocated uplink resource for the TTI is capable of accommodating the ProSe BSR MAC CE containing a buffer status for at least one ProSe Destination and its corresponding MAC subheader (it is judged yes in step 1001), if there exist side-link data available for transmission in the TTI (it is judged yes in step 1002), contents of the ProSe BSRs, that is, contents of the ProSe BSR MAC CE, may be determined according to the side-link data available for transmission by using an existing method or other implementable methods, and then the ProSe BSRs are reported at the TTI for reporting ProSe BSRs (step 1004).

In this embodiment, within a TTI, when the allocated uplink resource for the TTI is incapable of accommodating the ProSe BSR MAC CE containing a buffer status for at least one ProSe Destination and its corresponding MAC subheader (it is judged no in step 1001), no ProSe BSR needs to be reported, hence, contents of the ProSe BSR MAC CE need not to be determined, and at this moment, no processing is needed.

In an implementation of step 1002, whether there exist side-link data available for transmission can be judged according to whether there actually exist data in a side-link buffer, that is, if there actually exist data in a side-link buffer, a judgment result of step 1002 is yes; otherwise, a judgment result is no.

In this implementation, if the UE obtains the configured SL grant by decoding a PDCCH, after obtaining the PDCCH with an SL grant by decoding or at a beginning of an SC period for the SL grant, the UE may determine a size of data that can be transmitted in the whole SC period to which the SL grant corresponds according to resources allocated in the SL grant for transmitting data, and may generate all SL MAC PDUs that can be transmitted in the SC period to which the SL grant corresponds according to the size of data that can be transmitted.

Hence, as the SL grant obtained by decoding is taken into account, all SL MAC PDUs that can be transmitted in the SC period to which the SL grant obtained by decoding corresponds are built first, and then whether there exist data available for transmission at the TTI for reporting ProSe BSRs is judged.

In this implementation, the configured SL grant may be a configured SL grant for an SC period next to the SC period containing the TTI and/or a configured SL grant for an SC period secondarily next to the SC period containing the TTI.

In another implementation of step 1002, whether there exist side-link data available for transmission may be judged according to whether there actually exist data in a side-link buffer and whether there exists a configured SL grant. That is, whether there actually exist data in a side-link buffer is judged. If it is judged no, a judgment result in step 1002 is no; and if it is judged yes, whether there exists remaining SL grant is further judged. If it is judged no, a judgment result in step 1002 is yes; and if it is judged yes, whether the remaining SL grant is capable of accommodating all side-link data available for transmission in the sidelink buffer is further judged. If it is judged yes, a judgment result in step 1002 is no; otherwise, a judgment result in step 1002 is yes.

In this implementation, if the UE obtains the configured SL grant by decoding a PDCCH, at each TTI moment to which the SL grants correspond, the UE determines a size of data that can be transmitted in each TTI according to resources allocated in the SL grants for transmitting data, and generates SL MAC PDUs that can be transmitted in each TTI according to the size of data that can be transmitted.

In this implementation, the configured SL grant may be a configured SL grant for an SC period next to the SC period containing the TTI and/or a configured SL grant for an SC period secondarily next to the SC period containing the TTI.

With the method of this embodiment, a problem that UE is unable to determine contents of a ProSe BSR MAC CE to be transmitted at a TTI when triggered ProSe BSRs can be transmitted is solved.

Embodiment 3

Figure 11:
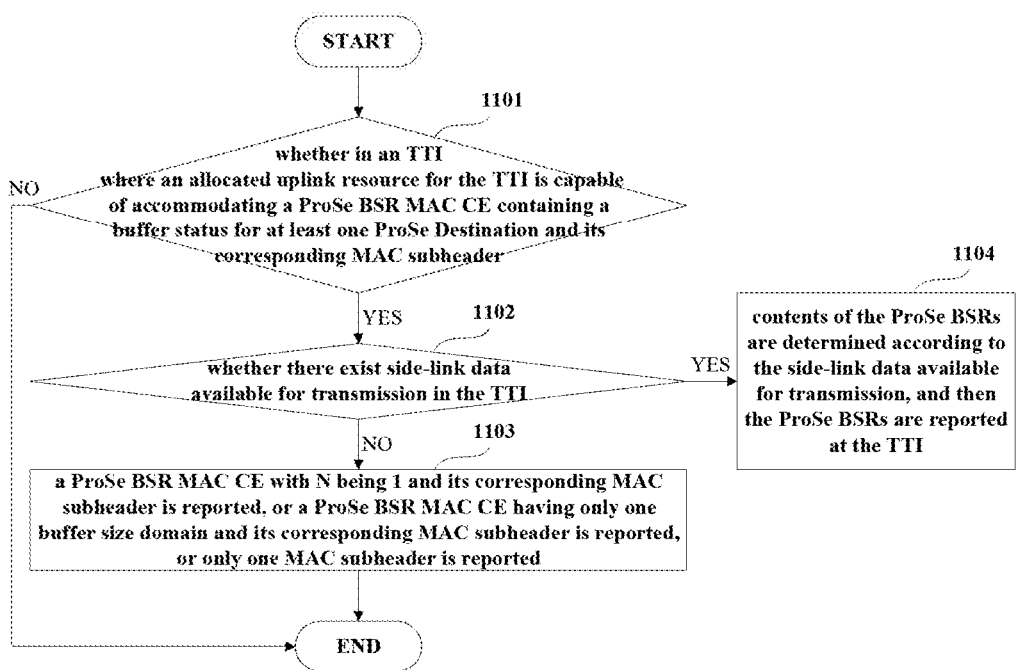
FIG. 11 is a flowchart of an implementation of a method for processing a buffer status report of Embodiment 3.

An embodiment of this disclosure further provides a method for processing a buffer status report, applicable also to user equipment (UE). FIG. 11 is a flowchart of the method. As shown in FIG. 11, the method includes:

step 1101: whether in an TTI where an allocated uplink resource for the TTI is capable of accommodating a ProSe BSR MAC CE containing a buffer status for at least one ProSe Destination and its corresponding MAC subheader is judged; if yes, step 1102 is executed; otherwise, the process is terminated;

step 1102: whether there exist side-link data available for transmission in the TTI is judged; and if there exist no side-link data available for transmission in the TTI, that is, it is judged no, step 1103 is executed; otherwise, step 1104 is executed;

step 1103: a ProSe BSR MAC CE with N being 1 and its corresponding MAC subheader is reported, or a ProSe BSR MAC CE having only one buffer size domain and its corresponding MAC subheader is reported, or only one MAC subheader is reported; and step 1104: contents of the ProSe BSRs, i.e. contents of the ProSe BSR MAC CE, are determined according to the side-link data available for transmission, and then the ProSe BSRs are reported at the TTI.

In an implementation of step 1102, whether there exist side-link data available for transmission may be judged according to whether there actually exist data in a side-link buffer, that is, if there actually exist data in a side-link buffer, a judgment result of step 1102 is yes; otherwise, a judgment result is no.

In another implementation of step 1102, whether there exist side-link data available for transmission may be judged according to whether there actually exist data in a side-link buffer and whether there exists a configured SL grant. That is, whether there actually exist data in a side-link buffer is judged. If it is judged no, a judgment result in step 1102 is no; and if it is judged yes, whether there exists remaining SL grant is further judged. If it is judged no, a judgment result in step 1102 is yes; and if it is judged yes, whether the remaining SL grant is capable of accommodating all side-link data available for transmission in the sidelink buffer is further judged. If it is judged yes, a judgment result in step 1102 is no; otherwise, a judgment result in step 1102 is yes.

In this embodiment, the configured SL grant may be a configured SL grant for an SC period next to the SC period containing the TTI and/or a configured SL grant for an SC period secondarily next to the SC period containing the TTI.

The method of this embodiment is similar to those of embodiments 1 and 2, with the exception that in the methods of embodiments 1 and 2, when it is judged that there exists no side-link data available for transmission at the TTI for reporting ProSe BSRs, all the triggered ProSe BSRs are cancelled, while in this embodiment, when it is judged that there exists no side-link data available for transmission at the TTI for reporting ProSe BSRs, a ProSe BSR of a special format is reported.

In an implementation, the ProSe BSR of a special format may be a ProSe BSR MAC CE with N being 1 and its corresponding MAC subheader; wherein, N is the number of ProSe destinations contained in the ProSe BSR MAC CE.

Figure 12:
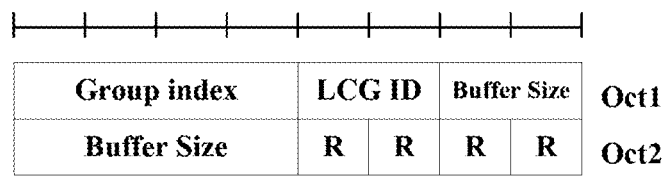
FIG. 12 is a schematic diagram of a format of an implementation of a ProSe BSR MAC CE of Embodiment 3.

FIG. 12 is a schematic diagram of the format of the ProSe BSR MAC CE of this implementation. In FIG. 12, "Group index" is an index of a group, "LCG ID" is an ID of a logic channel group, "buffer size" is a size of a buffer, a value of which being 0 in this implementation, and "R" is a reserved bit.

Figure 13:
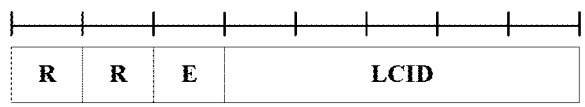
FIG. 13 is a schematic diagram of a format of an implementation of an MAC subheader of Embodiment 3.
Figure 14:
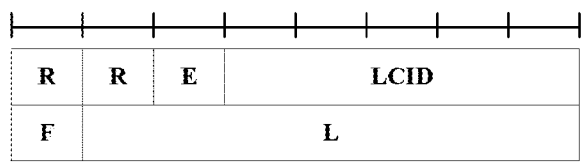
FIG. 14 is a schematic diagram of a format of another implementation of the MAC subheader of Embodiment 3.

In this implementation, a format of the MAC subheader corresponding to the ProSe BSR MAC CE shown in FIG. 12 is as shown in FIG. 13 or FIG. 14; however, this embodiment is not limited thereto. In the format of the MAC subheader shown in FIG. 13 and FIG. 14, "LCID" may be of a newly-defined value, which is referred to as a predefined value in this embodiment, and is used to indicate the format and/or a length of the ProSe BSR MAC CE to which it corresponds, with its value may be 11000, and 10110, etc., in this implementation. As shown in FIG. 13, "E" is an expanded bit, which is used to indicate whether it is another MAC subheader or an MAC PDU or an MAC CE after this MAC subheader. As shown in FIG. 14, bit "F" is used to indicate the number of bytes occupied by bit L, L being used to indicate a length of an MAC CE or an MAC PDU to which this MAC subheader corresponds.

In another implementation, the ProSe BSR of a special format may be a ProSe BSR MAC CE having only one buffer size domain and its corresponding MAC subheader.

Figure 15:
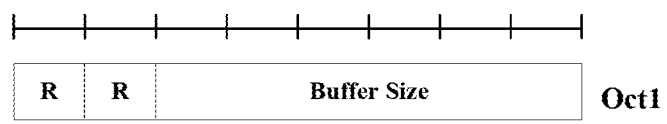
FIG. 15 is a schematic diagram of a format of another implementation of the ProSe BSR MAC CE of Embodiment 3.

FIG. 15 is a schematic diagram of the format of the ProSe BSR MAC CE of this implementation. In FIG. 15, "R" is a reserved bit, and "buffer size" is a size of a buffer, a value of which being 0 in this implementation. In this implementation, in the ProSe BSR MAC CE, Group index and LCG ID are not contained.

In this implementation, a format of the MAC subheader corresponding to the ProSe BSR MAC CE shown in FIG. 15 is as shown in FIG. 13; however, this embodiment is not limited thereto. In this implementation, the LCID has a meaning as described above, and it may be of a newly-defined value, which shall not be described herein any further.

In another implementation, the ProSe BSR of a special format may have only one MAC subheader, such as the MAC subheader shown in FIG. 13. In this implementation, the LCID in the MAC subheader has a meaning as described above, and it may be of a newly-defined value, which shall not be described herein any further.

In this embodiment, contents identical to those in Embodiment 1 or 2, such as steps 1001, 1002 and 1004, shall not be described herein any further.

In this embodiment, in an TTI, when an allocated uplink resource for the TTI is capable of accommodating a ProSe BSR MAC CE containing a buffer status for at least one ProSe Destination and its corresponding MAC subheader, if there exist no side-link data available for transmission in the TTI, a ProSe BSR MAC CE with N being 1 (FIG. 12) and its corresponding MAC subheader (FIG. 13 or 14) are reported, or a ProSe BSR MAC CE having only one buffer size domain (FIG. 15) and its corresponding MAC subheader (FIG. 13) are reported, or only one MAC subheader (FIG. 13) is reported, thereby solving a problem that UE is unable to determine contents of a ProSe BSR MAC CE to be transmitted at a TTI when triggered ProSe BSRs can be transmitted.

Embodiment 4

Figure 16:
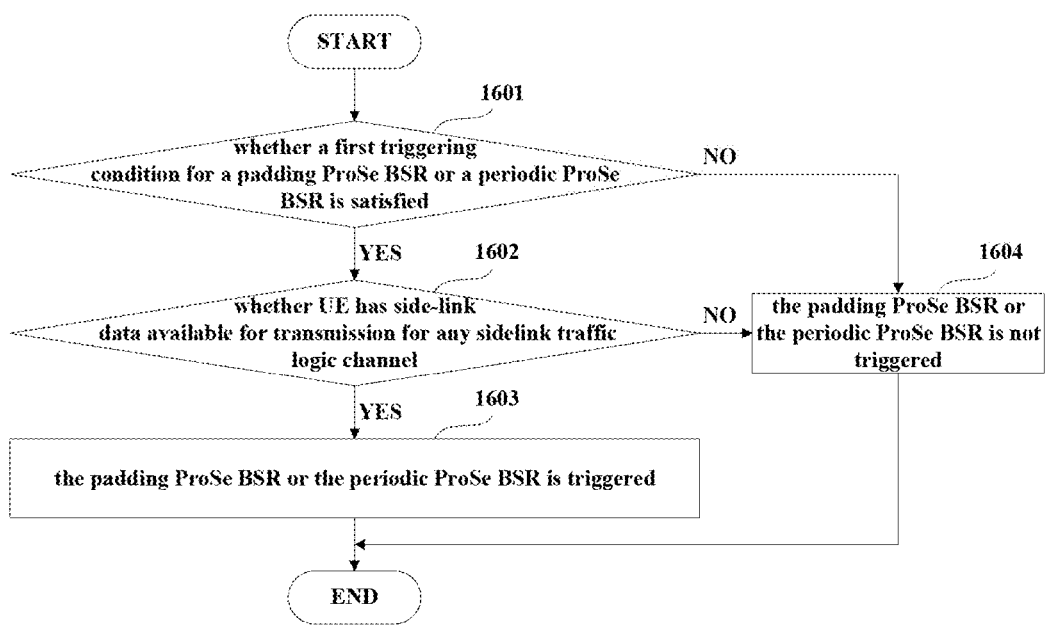
FIG. 16 is a flowchart of an implementation of a method for processing a buffer status report of Embodiment 4.

An embodiment of this disclosure further provides a method for processing a buffer status report, applicable also to user equipment (UE). FIG. 16 is a flowchart of the method. As shown in FIG. 16, the method includes:

step 1601: whether a first triggering condition for a padding ProSe BSR or a periodic ProSe BSR is satisfied is judged, and step 1602 is executed if yes, otherwise, step 1604 is executed;

step 1602: whether UE has side-link data available for transmission for any sidelink traffic logic channel is judged, and step 1603 is executed if yes, otherwise, step 1604 is executed;

step 1603: the padding ProSe BSR or the periodic ProSe BSR is triggered;

step 1604: the padding ProSe BSR or the periodic ProSe BSR is not triggered.

In this embodiment, the first triggering condition may be a triggering condition for a padding ProSe BSR or a periodic ProSe BSR defined in an existing standard, such as a condition defined in document "http://www.3gpp.org/ftp/tsg_ran/WG2_RL2/TSGR2_88/Docs/R2-145307", and may also be other established triggering conditions.

In this embodiment, when the first triggering condition is satisfied, the padding ProSe BSR or the periodic ProSe BSR is not triggered first, rather, whether UE has side-link data available for transmission for any sidelink traffic logic channel (STCH) is judged; if yes, the padding ProSe BSR or the periodic ProSe BSR is triggered; otherwise, it is not triggered. Hence, when the UE has no side-link data available for transmission for any sidelink traffic logic channel, the padding ProSe BSR or the periodic ProSe BSR is not triggered, thereby solving a problem that UE is unable to determine contents of a ProSe BSR MAC CE to be transmitted at a TTI when triggered ProSe BSRs can be transmitted.

Embodiment 5

Figure 17:
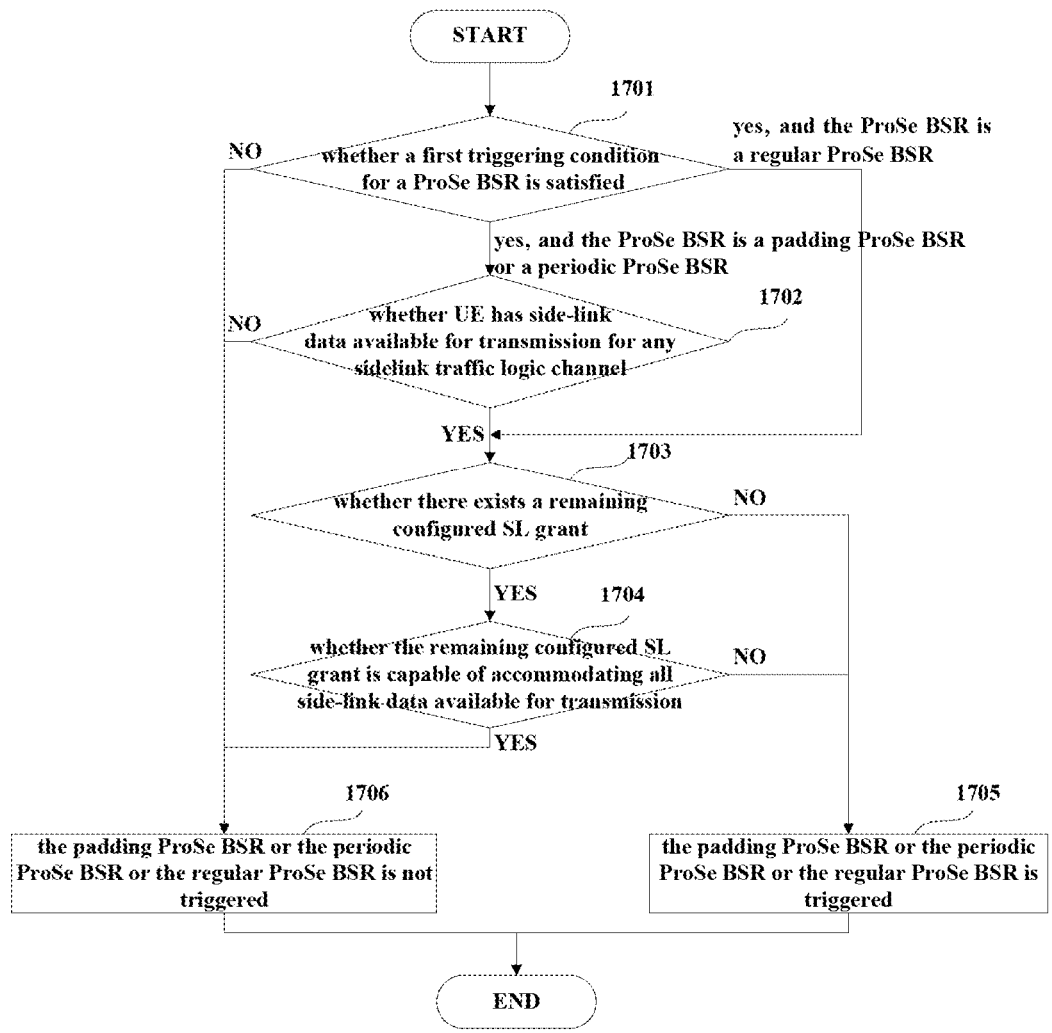
FIG. 17 is a flowchart of an implementation of a method for processing a buffer status report of Embodiment 5.

An embodiment of this disclosure further provides a method for processing a buffer status report, applicable also to user equipment (UE). FIG. 17 is a flowchart of the method. As shown in FIG. 17, the method includes:

step 1701: whether a first triggering condition for a ProSe BSR (a padding ProSe BSR or a periodic ProSe BSR or a regular ProSe BSR) is satisfied is judged, step 1702 is executed if yes and the ProSe BSR is a padding ProSe BSR or a periodic ProSe BSR, and step 1703 is executed if yes and the ProSe BSR is a regular ProSe BSR, otherwise, step 1706 is executed;

step 1702: whether UE has side-link data available for transmission for any sidelink traffic logic channel is judged, and step 1703 is executed if yes, otherwise, step 1706 is executed;

step 1703: whether there exists a remaining configured SL grant is judged, and step 1704 is executed if yes, otherwise, step 1705 is executed;

step 1704: whether the remaining configured SL grant is capable of accommodating all side-link data available for transmission is judged, and step 1706 is executed if yes, otherwise, step 1705 is executed;

step 1705: the padding ProSe BSR or the periodic ProSe BSR or the regular ProSe BSR is triggered;

step 1706: the padding ProSe BSR or the periodic ProSe BSR or the regular ProSe BSR is not triggered.

In this embodiment, for the padding ProSe BSR, the periodic ProSe BSR and the regular ProSe BSR, the first triggering condition in step 1701 may be a triggering condition for a padding ProSe BSR or a periodic ProSe BSR or a regular ProSe BSR defined in an existing standard, such as a condition defined in document "http://www.3gpp.org/ftp/tsg_ran/WG2_RL2/TSGR2_88/Docs/R2-145307", and may also be other established triggering conditions.

In this embodiment, when the first triggering condition for the padding ProSe BSR or the periodic ProSe BSR is satisfied, the padding ProSe BSR or the periodic ProSe BSR is not triggered first, rather, whether UE has side-link data available for transmission for any sidelink traffic logic channel (STCH) is judged; if no, the UE does not trigger the padding ProSe BSR or the periodic ProSe BSR; and if yes, whether there exists a remaining configured SL grant is further judged. If there exists no remaining configured SL grant, the UE triggers the padding ProSe BSR or the periodic ProSe BSR. If there exists a remaining configured SL grant, the UE judges whether the configured SL grant is capable of accommodating side-link data available for transmission of all sidelink traffic logic channels. If it is judged no, UE triggers the padding ProSe BSR or the periodic ProSe BSR. And if it is judged yes, the UE does not trigger the padding ProSe BSR or the periodic ProSe BSR.

In this embodiment, when the first triggering condition for the regular ProSe BSR is satisfied, the regular ProSe BSR is not triggered first, rather, whether there exists a remaining configured SL grant is judged. If no, the UE triggers the regular ProSe BSR. If there exists a remaining configured SL grant, the UE judges whether the SL grant is capable of accommodating side-link data available for transmission of all sidelink traffic logic channels. If it is judged no, UE triggers the regular ProSe BSR. And if it is judged yes, the UE does not trigger the regular ProSe BSR.

Hence, when the UE has no side-link data available for transmission for any sidelink traffic logic channel, the UE does not trigger the padding ProSe BSR or the periodic ProSe BSR; and when the UE has side-link data available for transmission but the remaining configured SL grant is capable of accommodating all these data, the UE does not trigger the padding ProSe BSR or the periodic ProSe BSR or the regular ProSe BSR, thereby solving a problem that UE is unable to determine contents of a ProSe BSR MAC CE to be transmitted at a TTI when triggered ProSe BSRs can be transmitted.

In this embodiment, the configured SL grant may be a configured SL grant for an SC period next to the SC period containing the TTI and/or a configured SL grant for an SC period secondarily next to the SC period containing the TTI.

The methods of the embodiments are described above in five embodiments. And in particular implementation, the five embodiments may be combined, or may be used separately. For example, embodiments 1 and 2 may be combined with embodiments 4 and 5, embodiment 3 may be combined with embodiments 4 and 5, and embodiments 1, 2, 3, 4 and 5 may implemented respectively.

Embodiment 6

The embodiment of this disclosure provides an apparatus for processing a buffer status report, applicable to user equipment. As principles of the apparatus for solving problems are similar to those of the methods of embodiments 1 and 2, the implementation of the methods of embodiments 1 and 2 may be referred to for implementation of the apparatus, with identical contents being not going to be described herein any further.

Figure 18:
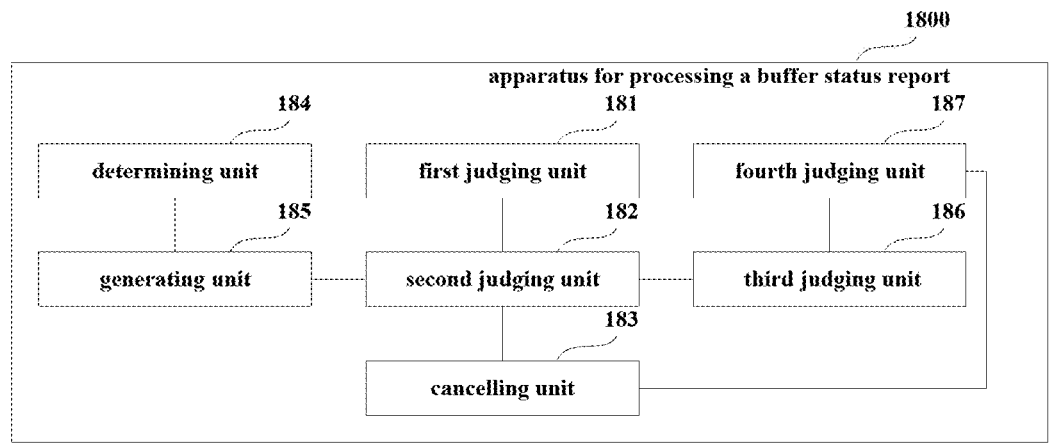
FIG. 18 is a schematic diagram of a structure of an implementation of an apparatus for processing a buffer status report of Embodiment 6.

FIG. 18 is a schematic diagram of a structure of the apparatus. Referring to FIG. 18, the apparatus 1800 for processing a buffer status report includes a first judging unit 181, a second judging unit 182 and a cancelling unit 183.

In this embodiment, the first judging unit 181 is configured to judge whether in an TTI where an allocated uplink resource for the TTI is capable of accommodating a ProSe BSR MAC CE containing a buffer status for at least one ProSe Destination and its corresponding MAC subheader.

In this embodiment, the second judging unit 182 is configured to, when it is judged yes by the first judging unit 181, judge whether there exist side-link data available for transmission in the TTI; wherein, a judgment manner of the second judging unit 182 is slightly different from those in embodiments 1 and 2, and embodiments 1 and 2 may be referred to for details.

In this embodiment, the cancelling unit 183 is configured to, when it is judged no by the second judging unit 182, cancel all triggered ProSe BSRs.

In this embodiment, within a TTI, when the allocated uplink resource for the TTI is capable of accommodating the ProSe BSR MAC CE containing a buffer status for at least one ProSe Destination and its corresponding MAC subheader, if there exists no side-link data available for transmission in the TTI, all the triggered ProSe BSRs are cancelled; hence, a problem that UE is unable to determine contents of a ProSe BSR MAC CE to be transmitted at a TTI moment when triggered ProSe BSRs can be transmitted is solved.

In an implementation, the apparatus 1800 for processing a buffer status report further includes a determining unit 184 and a generating unit 185.

In this implementation, the determining unit 184 is configured to, after the UE decodes and obtains a PDCCH with an SL grant or at a beginning of an SC period for the SL grant, determine a size of data that can be transmitted in the whole SC period to which the SL grant corresponds according to resources allocated in the SL grant for transmitting data.

In this implementation, the generating unit 185 is configured to generate all SL MAC PDUs that can be transmitted in the SC period to which the SL grant corresponds according to the size of data that can be transmitted determined by the determining unit 184.

In this implementation, all SL MAC PDUs that can be transmitted in the SC period to which the SL grant corresponds are built first, and then whether there exist side-link data available for transmission at the TTI for transmitting ProSe BSRs is judged. Therefore, not only the problem in scenarios 1 and 2 is solved, but also a problem in scenarios 3, 4 and 5 is solved.

In an implementation, the apparatus 1800 for processing a buffer status report further includes a third judging unit 186 and a fourth judging unit 187. In this implementation, the third judging unit 186 is configured to, when it is judged that there exist side-link data available for transmission in the TTI for transmitting ProSe BSRs by the second judging unit 182, judge whether there exists a remaining configured SL grant; and the fourth judging unit 187 is configured to, when it is judged yes by the third judging unit 186, judge whether the remaining configured SL grant is capable of accommodating all the side-link data available for transmission. The cancelling unit 183 is configured to cancel all the triggered ProSe BSRs when it is judged yes by the fourth judging unit 187.

In this implementation, the configured SL grant may be a configured SL grant for an SC period next to the SC period containing the TTI, thereby solving the problem in scenario 3.

In this implementation, the configured SL grant may be a configured SL grant for an SC period secondarily next to the SC period containing the TTI, thereby solving the problem in scenario 5.

In this embodiment, the second judging unit 182 may judge whether there exist side-link data available for transmission according to data actually existed in a side-link buffer. If there actually exist data in the side-link buffer, the second judging unit judges that there exist side-link data available for transmission; otherwise, the second judging unit judges that there exists no side-link data available for transmission. Embodiment 2 may be referred to for details, which shall not be described herein any further.

In this embodiment, the second judging unit 182 may also judge whether there exist side-link data available for transmission according to the data actually existed in the side-link buffer and the configured SL grant. If there actually exist data in the side-link buffer and the configured SL grant is incapable of accommodating all data existed in the side-link buffer, the second judging unit judges that there exist side-link data available for transmission; otherwise, the second judging unit judges that there exists no side-link data available for transmission. Embodiment 2 may be referred to for details, which shall not be described herein any further.

Embodiment 7

The embodiment of this disclosure provides an apparatus for processing a buffer status report, applicable to user equipment. As principles of the apparatus for solving problems are similar to that of the method of Embodiment 3, the implementation of the method of Embodiment 3 may be referred to for implementation of the apparatus, with identical contents being not going to be described herein any further.

Figure 19:
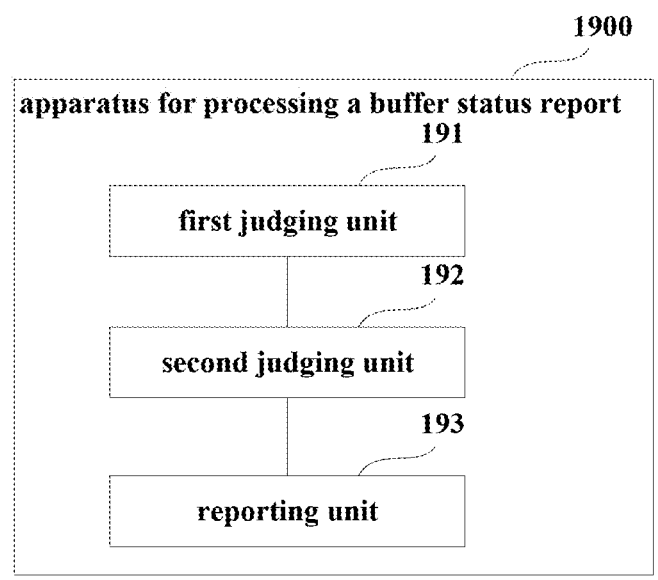
FIG. 19 is a schematic diagram of a structure of an implementation of an apparatus for processing a buffer status report of Embodiment 7.

FIG. 19 is a schematic diagram of a structure of the apparatus. Referring to FIG. 19, the apparatus 1900 for processing a buffer status report includes a first judging unit 191, a second judging unit 192 and a reporting unit 193.

In this embodiment, principles and implementation processes of the first judging unit 191 and the second judging unit 192 are identical to those of the first judging unit 181 and the second judging unit 182 of Embodiment 6, the contents of which being incorporated herein, which shall not be described herein any further.

In this embodiment, in an TTI, when an allocated uplink resource for the TTI is capable of accommodating a ProSe BSR MAC CE containing a buffer status for at least one ProSe Destination and its corresponding MAC subheader (it is judged yes by the first judging unit 191) and there exist no data available for transmission in the TTI (it is judged no by the second judging unit 192), the reporting unit 193 reports a ProSe BSR MAC CE with N being 1 and its corresponding MAC subheader, or reports a ProSe BSR MAC CE having only one buffer size domain and its corresponding MAC subheader, or only reports one MAC subheader.

In this embodiment, an LCID in the MAC subheader is a predefined value for indicating the ProSe BSR MAC CE to which it corresponds.

In this embodiment, in an TTI, when an allocated uplink resource for the TTI is capable of accommodating a ProSe BSR MAC CE containing a buffer status for at least one ProSe Destination and its corresponding MAC subheader, if there exist no data available for transmission in the TTI, a ProSe BSR of a special format is reported, thereby solving a problem that UE is unable to determine contents of a ProSe BSR MAC CE to be transmitted at a TTI when triggered ProSe BSRs can be transmitted.

In this embodiment, similar to Embodiment 6, the second judging unit 182 may judge whether there exist side-link data available for transmission according to data actually existed in a side-link buffer, and may also judge whether there exist side-link data available for transmission according to the data actually existed in the side-link buffer and the configured SL grant.

Embodiment 8

The embodiment of this disclosure provides an apparatus for processing a buffer status report, applicable to user equipment. As principles of the apparatus for solving problems are similar to those of the methods of embodiments 4 and 5, the implementation of the methods of embodiments 4 and 5 may be referred to for implementation of the apparatus, with identical contents being not going to be described herein any further.

Figure 20:
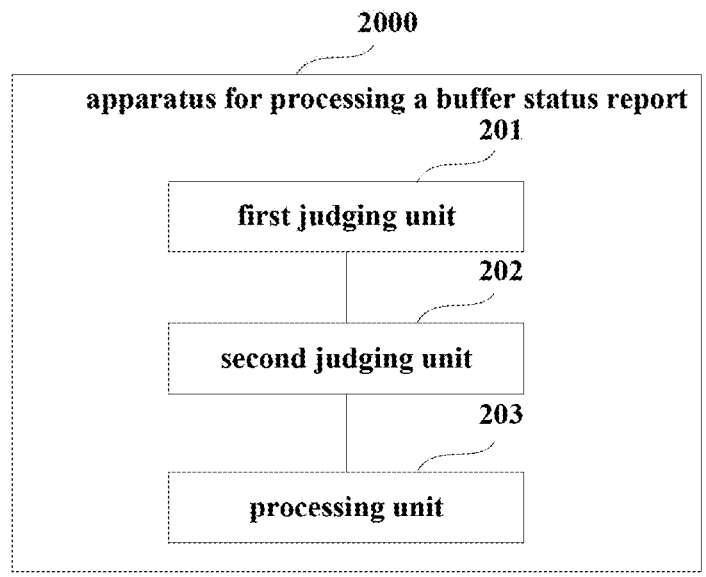
FIG. 20 is a schematic diagram of a structure of an implementation of an apparatus for processing a buffer status report of Embodiment 8.

FIG. 20 is a schematic diagram of a structure of an implementation of the apparatus. Referring to FIG. 20, the apparatus 2000 for processing a buffer status report includes a first judging unit 201, a second judging unit 202 and a processing unit 203.

In this embodiment, the first judging unit 201 is configured to judge whether a first triggering condition for a padding ProSe BSR or a periodic ProSe BSR is satisfied.

In this embodiment, the second judging unit 202 is configured to judge whether UE has side-link data available for transmission for any sidelink traffic logic channel when it is judged yes by the first judging unit 201.

In this embodiment, the processing unit 203 is configured to trigger the padding ProSe BSR or the periodic ProSe BSR when it is judged yes by the second judging unit 202. Furthermore, the processing unit 203 is further configured not to trigger the padding ProSe BSR or the periodic ProSe BSR when it is judged no by the second judging unit 202.

In this embodiment, when UE has no side-link data available for transmission for any sidelink traffic logic channel, the padding ProSe BSR or the periodic ProSe BSR is not triggered, even if an original triggering condition of the padding ProSe BSR or the periodic ProSe BSR is satisfied, thereby solving a problem that UE is unable to determine contents of a ProSe BSR MAC CE to be transmitted at a TTI when triggered ProSe BSRs can be transmitted.

Figure 21:
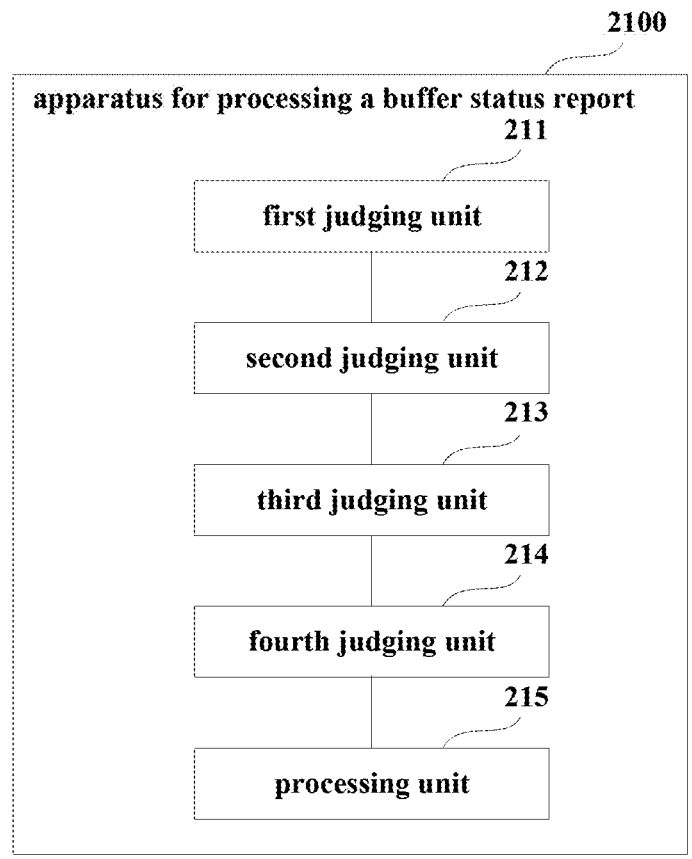
FIG. 21 is a schematic diagram of a structure of another implementation of the apparatus for processing a buffer status report of Embodiment 8.

FIG. 21 is a schematic diagram of a structure of another implementation of the apparatus. Referring to FIG. 21, the apparatus 2100 for processing a buffer status report includes a first judging unit 211, a second judging unit 212, a third judging unit 213, a fourth judging unit 214 and a processing unit 215.

The first judging unit 211 is configured to judge whether a first triggering condition for a ProSe BSR is satisfied.

The second judging unit 212 is configured to judge whether UE has side-link data available for transmission for any sidelink traffic logic channel when it is judged yes by the first judging unit 211 and the ProSe BSR is a padding ProSe BSR or a periodic ProSe BSR.

The third judging unit 213 is configured to judge whether there exists a remaining configured SL grant when it is judged yes by the second judging unit or it is judged yes by the first judging unit and the ProSe BSR is a regular ProSe BSR.

The fourth judging unit 214 is configured to judge whether the remaining configured SL grant is capable of accommodating all side-link data available for transmission when it is judged yes by the third judging unit 213.

And the processing unit 215 is configured to not trigger the padding ProSe BSR or the periodic ProSe BSR or the regular ProSe BSR when it is judged no by the first judging unit 211, or it is judged no by the second judging unit 212, or it is judged yes by the fourth judging unit 214, and trigger the padding ProSe BSR or the periodic ProSe BSR or the regular ProSe BSR when it is judged no by the third judging unit 213 or it is judged no by the fourth judging unit.

With the apparatus of this embodiment, a problem that UE is unable to determine contents of a ProSe BSR MAC CE to be transmitted at a TTI when triggered ProSe BSRs can be transmitted is solved.

Embodiment 9

The embodiment of this disclosure further provides UE, including the apparatus for processing a buffer status report as described in embodiments 6-8.

Figure 22:
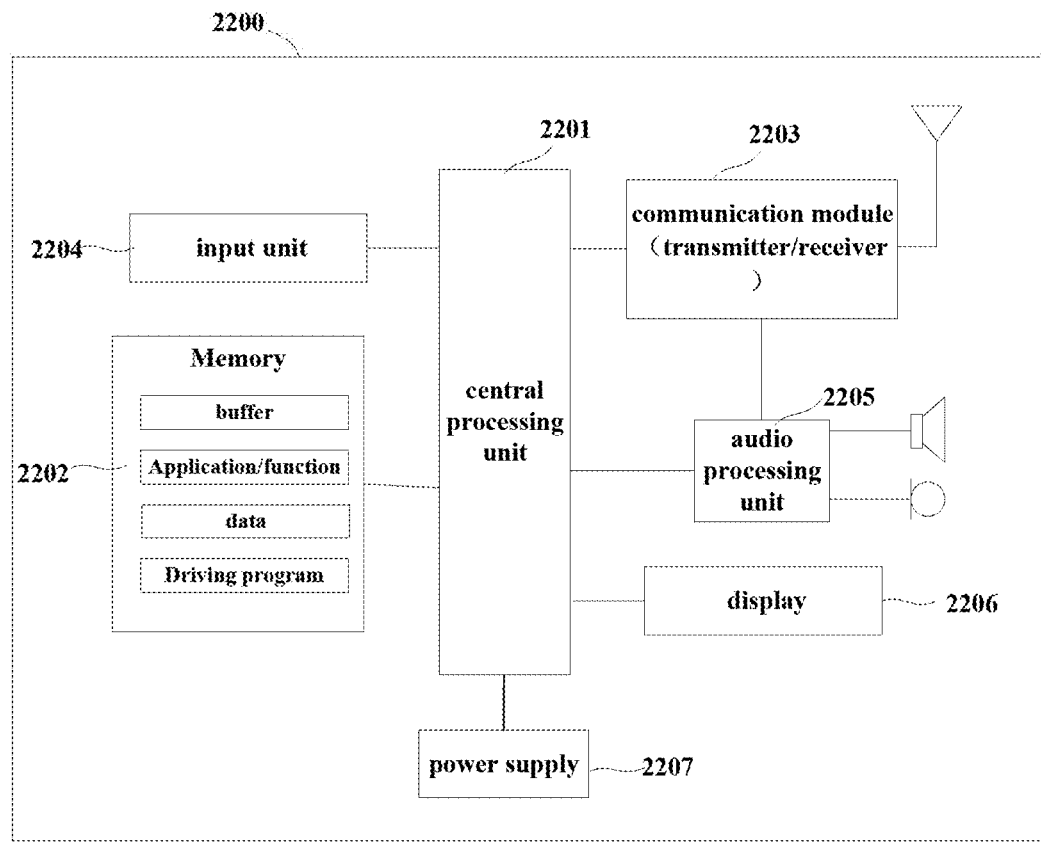
FIG. 22 is a schematic diagram of a structure of the UE of an embodiment.

FIG. 22 is a schematic diagram of a structure of the UE of the embodiment of this disclosure. As shown in FIG. 22, the UE 2200 may include a central processing unit 2201 and a memory 2202, the memory 2202 being coupled to the central processing unit 2201. It should be noted that this figure is illustrative only, and other types of structures may also be used, so as to supplement or replace this structure and achieve a telecommunications function or other functions.

In an implementation, the functions of the apparatus for processing a buffer status report may be integrated into the central processing unit 2201, and the central processing unit 2201 carries out functions of the apparatus for processing a buffer status report described in embodiments 6-8. In this implementation, the functions of the apparatus for processing a buffer status report are incorporated herein, and shall not be described herein any further.

In another implementation, the apparatus for processing a buffer status report and the central processing unit 2201 may be configured separately. For example, the apparatus for processing a buffer status report may be configured as a chip connected to the central processing unit 2201, with its functions being realized under control of the central processing unit 2201.

As shown in FIG. 22, the UE 2200 may further include a communication module 2203, an input unit 2204, an audio processing unit 2205, a display 2206 and a power supply 2207. It should be noted that the UE 2200 does not necessarily include all the parts shown in FIG. 22, and furthermore, the UE 2200 may include parts not shown in FIG. 22, and the prior art may be referred to.

As shown in FIG. 22, the central processing unit 2201 is sometimes referred to as a controller or control, and may include a microprocessor or other processor devices and/or logic devices. The central processing unit 2201 receives input and controls operations of every components of the UE 2200.

In this embodiment, the memory 2202 may be, for example, one or more of a buffer memory, a flash memory, a hard drive, a mobile medium, a volatile memory, a nonvolatile memory, or other suitable devices, which may store the above planned network information and deployed network information, and may further store a program executing related information. And the central processing unit 2201 may execute the program stored in the memory 2202, so as to realize information storage or processing, etc. Functions of other parts are similar to those of the prior art, which shall not be described herein any further. The parts of the UE 2200 may be realized by specific hardware, firmware, software, or any combination thereof, without departing from the scope of the present disclosure.

With the UE of this embodiment, a problem that UE is unable to determine contents of a ProSe BSR MAC CE to be transmitted at a TTI when triggered ProSe BSRs can be transmitted is solved.

Embodiment 10

Figure 23:
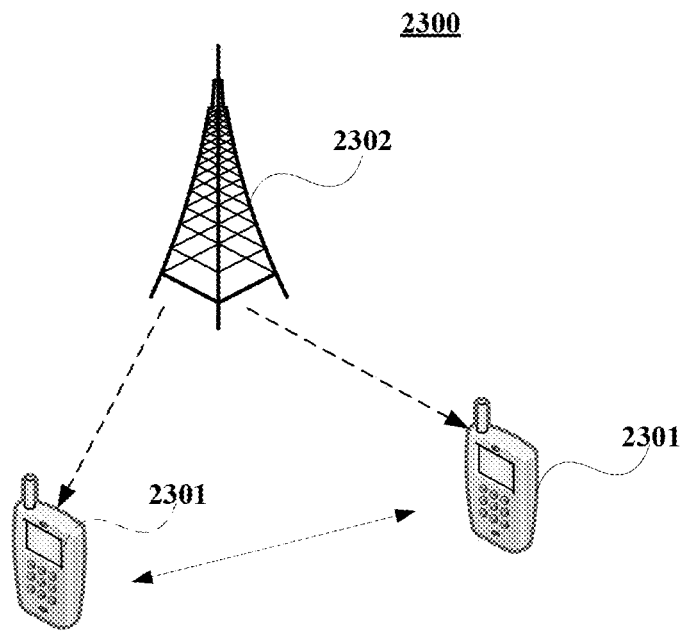
FIG. 23 is a schematic diagram of a topology of the communication system of an embodiment.

The embodiment of this disclosure further provides a communication system. FIG. 23 is a schematic diagram of a topology of the communication system of this embodiment. As shown in FIG. 23, the communication system 2300 includes UE 2301 and an eNB 2302.

In this embodiment, the eNB 2302 is configured to transmit PDCCHs with SL grants and PDCCHs with UL grants to the UE 2301 at an appropriate time, which may be carried out by an existing eNB, and shall not be described herein any further.

In this embodiment, the UE 2301 is configured to perform communication based on a conventional infrastructure with the eNB 2302, and at the same time, perform D2D communication with other UEs 2301.

In this embodiment, the UE 2301 may use the method for processing a buffer status report described in embodiments 1-5, that is, carrying out the functions of the apparatus for processing a buffer status report described in embodiments 6-8. The contents of embodiments 1-8 are incorporated herein, which shall not be described herein any further.

With the communication system of this embodiment, a problem that UE is unable to determine contents of a ProSe BSR MAC CE to be transmitted at a TTI when triggered ProSe BSRs can be transmitted is solved.

An embodiment of the present disclosure provides a computer readable program code, which, when executed in an apparatus for processing a buffer status report or UE, will cause a computer unit to carry out the method for processing a buffer status report described in embodiments 1-5 in the apparatus for processing a buffer status report or the UE.

An embodiment of the present disclosure provides a computer readable medium, including a computer readable program code, which will cause a computer unit to carry out the method for processing a buffer status report described in embodiments 1-5 in an apparatus for processing a buffer status report or UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A user equipment (UE), the UE comprising:
   a memory that stores a plurality of instructions: and
   a processor that couples to the memory and configured to execute the instructions to:
   judge whether in a Transmission Time Interval (TTI) where an allocated uplink resource for the TTI is capable of accommodating a Sidelink Buffer Status Report (BSR) Medium Access Control (MAC) Control Element (CE) containing a buffer status for at least one Sidelink Destination and its corresponding MAC sub-header;
   when it is judged yes, judge whether there exist side-link data available for transmission in the TTI; and when it is judged that there does not exist side-link data available for transmission in the TTI, cancel all triggered Sidelink BSRs.

2. The UE according to claim 1, wherein the processor is further configured to execute the instructions to:
   after the UE decodes and obtains a PDCCH Physical Downlink Control Channel (PDCCH) with a Sidelink (SL) grant or at a beginning of a scheduling control (SC) period for the SL grant, determine a size of data that can be transmitted in the whole SC period to which the SL grant corresponds according to resources allocated in the SL grant for transmitting data; and
   generate all SL MAC Protocol Data Units (PDUs) that can be transmitted in the SC period to which the SL grant corresponds according to the size of data that can be transmitted in the whole SC period.

3. The UE according to claim 1, wherein the processor is further configured to execute the instructions to:
   when it is judged that there exist side-link data available for transmission in the TTI, judge whether there exists a remaining configured SL grant; and
   when it is judged that there exists a remaining configured SL grant, judge whether all the side-link data available for transmission can be accommodated by the remaining configured SL grant;
   and when it is judged that all the side-link data available for transmission can be accommodated by the remaining configured SL grant, cancel all the triggered Sidelink BSRs.

4. The UE according to claim 3, wherein the configured SL grant is a configured SL grant for an SC period next to the SC period containing the TTI.

5. The UE according to claim 3, wherein the configured SL grant is a configured SL grant for an SC period secondarily next to the SC period containing the TTI.

6. The UE according to claim 1, wherein the processor is further configured to judge whether there exist side-link data available for transmission in the TTI according to data actually existed in a side-link buffer.

7. The UE according to claim 6, wherein if there actually exist data in the side-link buffer, the processor is configured to judge that there exist side-link data available for transmission; otherwise, the processor judges that there exist no side-link data available for transmission.

8. The UE according to claim 1, wherein the processor is configured to judge whether there exist side-link data available for transmission in the TTI according to the data actually existed in a side-link buffer and a configured SL grant.

9. The UE according to claim 8, wherein if there actually exist data in the side-link buffer and the configured SL grant is incapable of accommodating all data existing in the side-link buffer, the processor is configured to judge that there exist side-link data available for transmission; otherwise, the processor judges that there exist no side-link data available for transmission.

10. A user equipment (UE) comprising:
    a memory that stores a plurality of instructions;
    a processor that couples to the memory and configured to execute the instructions to:
    judge whether in a Transmission Time Interval (TTI) where an allocated uplink resource for the TTI is capable of accommodating a Sidelink Buffer Status Report (BSR) Medium Access Control (MAC) Control Element (CE) containing a buffer status for at least one Sidelink Destination and its corresponding MAC subheader;
    when it is judged yes, judge whether there exist side-link data available for transmission in the TTI; and
    when it is judged there does not exist side-link data available for transmission in the TTI, report a Sidelink BSR MAC CE with N being 1 and its corresponding MAC subheader, or report a Sidelink BSR MAC CE having only one buffer size domain and its corresponding MAC subheader, or report only one MAC subheader.

11. The UE according to claim 10, wherein a Logical Channel ID in the MAC subheader is a predefined value for indicating the Sidelink BSR MAC CE to which it corresponds.

12. The UE according to claim 10, wherein the processor is configured to judge whether there exist side-link data available for transmission in the TTI according to data actually existed in a side-link buffer.

13. The UE according to claim 12, wherein if there actually exist data in the side-link buffer, the processor is configured to judge that there exist side-link data available for transmission; otherwise, the processor judges that there exist no side-link data available for transmission.

14. The UE according to claim 10, wherein the processor is configured to judge whether there exist side-link data available for transmission in the TTI according to data actually existed in a side-link buffer and a configured Side link (SL) grant.

15. The UE according to claim 14, wherein if there actually exist data in the side-link buffer and the configured SL grant is incapable of accommodating all data existing in the side-link buffer, the processor is configured to judge that there exist side-link data available for transmission; otherwise, the processor judges that there exist no side-link data available for transmission.

16. A communication system, comprising user equipment, the user equipment comprising:
    a memory that stores a plurality of instructions;
    a processor that couples to the memory and configured to execute the instructions to:
    in a Transmission Time Interval (TTI) where an allocated uplink resource for the TTI is capable of accommodating a Sidelink Buffer Status Report (BSR) Medium Access Control (MAC) Control Element (CE) containing a buffer status for at least one Sidelink Destination and its corresponding MAC subheader, if there exist no side-link data available for transmission in the TTI, cancel all triggered Sidelink BSRs, or report a Sidelink BSR MAC CE with N being 1 and its corresponding MAC subheader, or report a Sidelink BSR MAC CE having only one buffer size domain and its corresponding MAC subheader, or report only one MAC subheader.

* * * * *